(12) United States Patent
Yukawa et al.

(10) Patent No.: US 6,726,289 B2
(45) Date of Patent: Apr. 27, 2004

(54) TIRE NOISE REDUCING SYSTEM

(75) Inventors: Naoki Yukawa, Kobe (JP); Masami Nishikawa, Kobe (JP); Tokuzo Nakajima, Kobe (JP); Chieko Aoki, Kobe (JP); Hideaki Sugihara, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/122,326

(22) Filed: Apr. 16, 2002

(65) Prior Publication Data

US 2003/0020320 A1 Jan. 30, 2003

(30) Foreign Application Priority Data

| Apr. 16, 2001 | (JP) | ................................. | 2001-117116 |
| Aug. 2, 2001 | (JP) | ................................. | 2001-235327 |
| Aug. 28, 2001 | (JP) | ................................. | 2001-258227 |
| Mar. 5, 2002 | (JP) | ................................. | 2002-059186 |

(51) Int. Cl.$^7$ .................... B60B 19/00; B60B 27/00; B60C 23/18; B60C 19/00

(52) U.S. Cl. .............. 301/6.91; 301/5.22; 152/154.3; 152/153

(58) Field of Search ............... 295/7; 74/443; 301/6.91, 5.21, 5.22; 152/381.6, 153, 154.1, 209.4, 209.5, 209.6, 209.7, 450, 339.1, 311, 313, 391, 399

(56) References Cited

U.S. PATENT DOCUMENTS

| 4,392,522 A | * | 7/1983 | Bschorr | ................... 152/341.1 |
| 4,399,851 A | * | 8/1983 | Bschorr | ................... 152/156 |
| 5,252,668 A | * | 10/1993 | Mori et al. | ................... 525/102 |
| 6,244,314 B1 | * | 6/2001 | Dodt et al. | ................... 152/158 |
| 6,343,843 B1 | * | 2/2002 | Nishikawa | ................... 301/6.91 |
| 6,422,655 B1 | * | 7/2002 | Britton et al. | ................... 301/6.91 |
| 6,581,658 B2 | * | 6/2003 | Nakajima et al. | ......... 152/154.1 |
| 6,648,421 B1 | * | 11/2003 | Akiyoshi et al. | .......... 301/6.91 |

FOREIGN PATENT DOCUMENTS

| DE | 198 06 935 A1 | 9/1999 | |
| JP | 04334603 | 11/1992 | |
| JP | 07266802 | 10/1995 | |
| JP | 2002-67608 A | 3/2002 | |
| JP | 2002195907 A | * 7/2002 | .............. 152/154.1 |

OTHER PUBLICATIONS

US 2002/0124921 A1, Nakajima et al, Sep. 12, 2002, all.*

* cited by examiner

Primary Examiner—S. Joseph Morano
Assistant Examiner—Jason R. Bellinger
(74) Attorney, Agent, or Firm—Birch, Stewart, Kolasch & Birch, LLP

(57) ABSTRACT

A tire noise reducing system comprises a pneumatic tire, a wheel rim and a noise damper disposed in a cavity formed between the rim and tire when mounted as being surrounded by the tire and rim, the noise damper is made of a porous material having a specific gravity of from 0.005 to 0.06 and secured on a surface facing the cavity, the volume S2 of the noise damper is in a range of from 0.4 to 20.0% of the volume S1 of the cavity. Preferably, the noise damper is provided with an uneven surface or an outer layer for less sound reflection, and the shape index E of the noise damper is more than 1, and the ratio T/W of the thickness T to the width W of the damper is not less than 1.

14 Claims, 10 Drawing Sheets

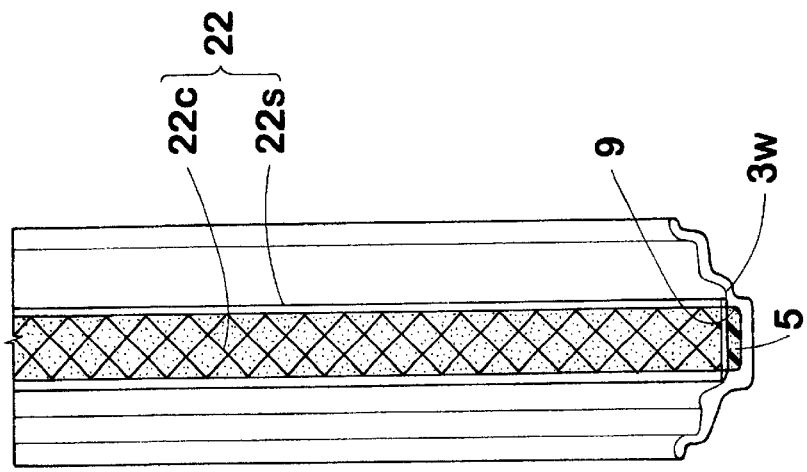
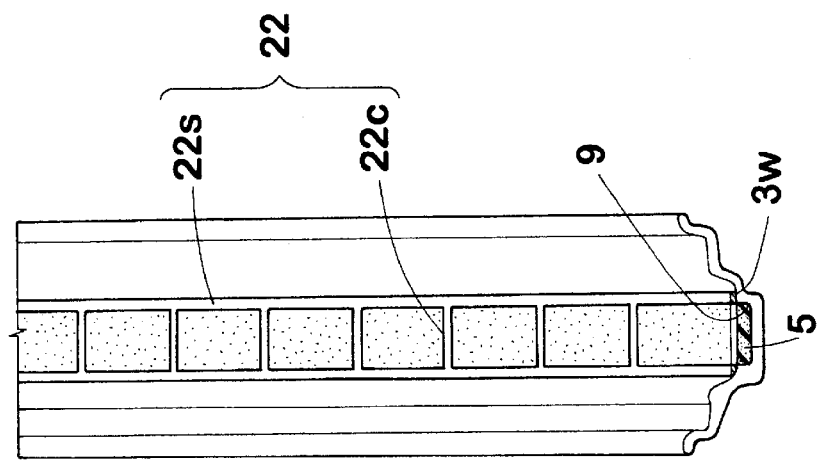
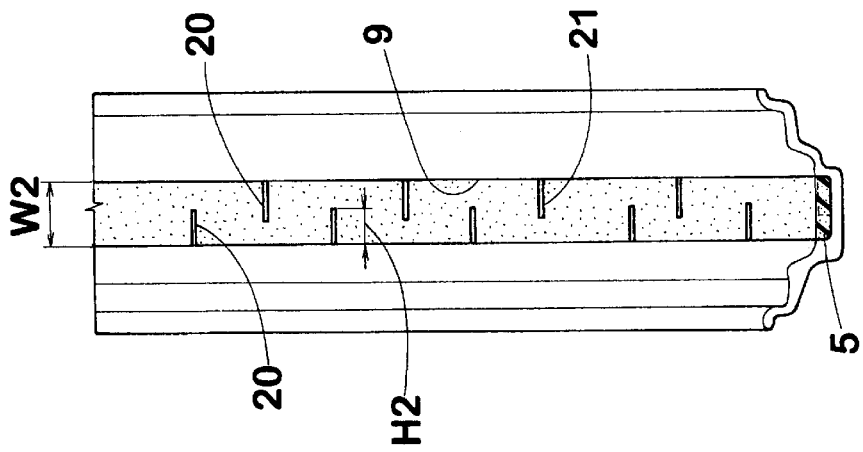

TIRE NOISE REDUCING SYSTEM

FIELD OF INVENTION

The present invention relates to a tire noise reducing system, more particularly to a noise damper which is disposed on a pneumatic tire or wheel rim facing the tire cavity.

DESCRIPTION OF RELATED ART

As is well known, when a pneumatic tire is mounted on a wheel rim, the tire hollow forms a closed annular cavity filled with air. During running the air is excited by vibrations and resonance is caused at specific frequencies depending on the size of the cavity. Such resonance worsens the running noise from the tire.

It was known that such a resonance noise can be reduced by putting a sponge-like material into the cavity. However, if a big damper is used in order to completely reduce the resonance noise, even if the damper is made of a light sponge-like material, the wheel is liable to lose its rotational balance. This is particularly remarkable when the damper contacts with the tire inside.

BRIEF SUMMARY OF THE INVENTION

It is therefore, an object of the present invention to provide a noise reducing system including a noise damper being capable of achieving a maximum noise reduction with a minimum damper size.

According to one aspect of the present invention, a tire noise reducing system includes:

a pneumatic tire, a wheel rim on which the pneumatic tire is mounted, and a noise damper disposed in a cavity, the cavity formed between the rim and tire when mounted as being surrounded by the tire and rim, the noise damper being made of a porous material having a specific gravity of from 0.005 to 0.06 and secured on a surface facing the cavity, and the volume S2 of the noise damper being in a range of from 0.4 to 20.0% of the volume S1 of the cavity.

Preferably, the noise damper is provided with an uneven surface or an outer layer for less sound reflection facing the cavity. The undermentioned shape index E of the noise damper is more than 1, and the ratio T/W of the thickness T to the width W of the damper is not less than 1.

BRIEF DESCRIPTION OF DRAWINGS

Embodiments of the present invention will now be described in detail in conjunction with the accompanying drawings.

FIGS. 13–16 are developed views each showing another example of the wheel rim.

DETAILED DESCRIPTION OF INVENTION

Figure 1:
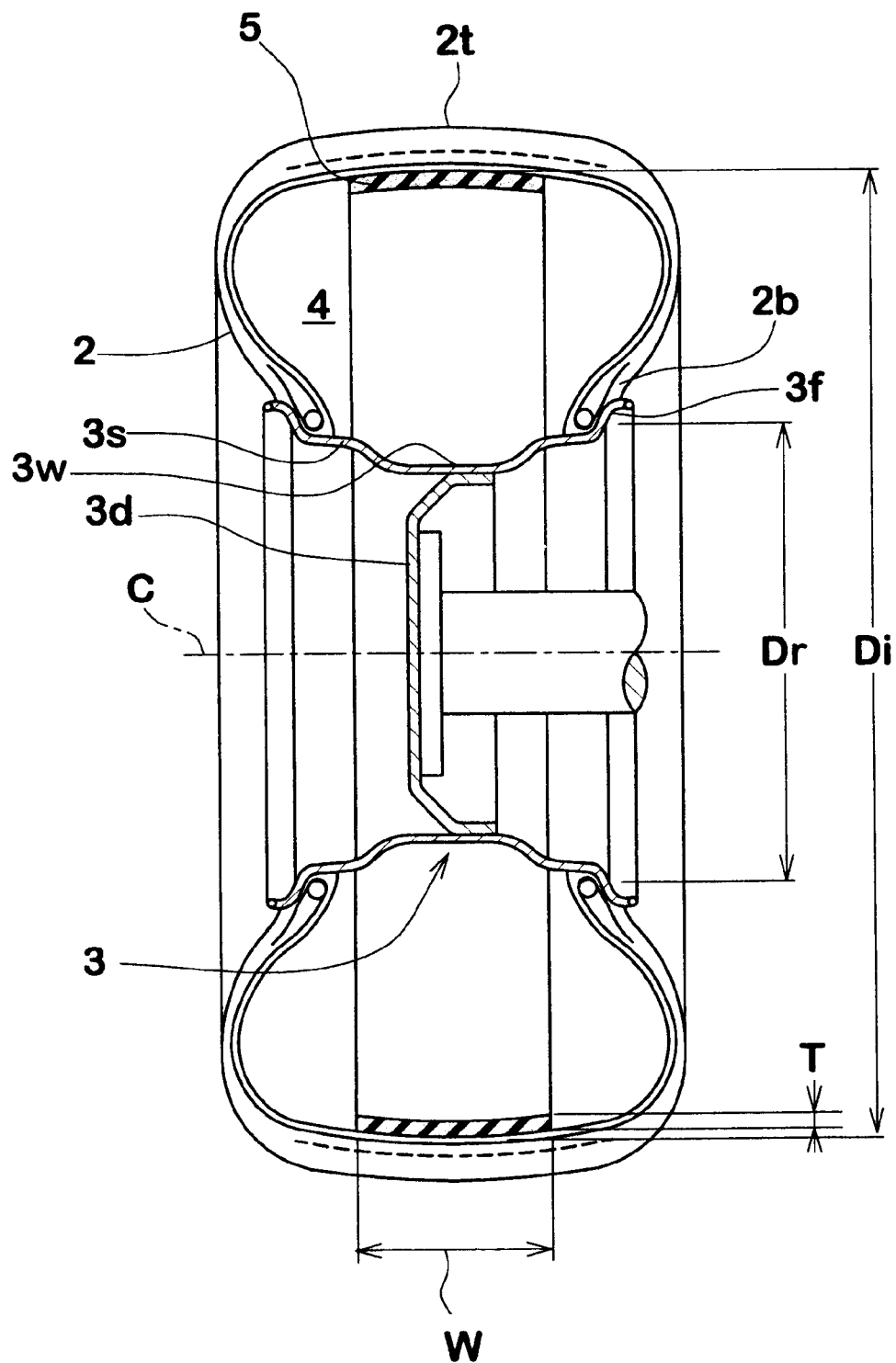
FIG. 1 is a cross sectional view of a tire and rim assembly showing an embodiment of the present invention.

According to the present invention, a tire noise reducing system includes a pneumatic tire 2 with a wheel centerline C, a wheel rim 3 on which the tire 2 is mounted and a noise damper 5 disposed in a cavity 4, wherein the cavity 4 is defined as being surrounded by the pneumatic tire 2 and wheel rim 3 when the pneumatic tire 2 is mounted on the wheel rim 3.

The pneumatic tire 2 is a tubeless tire comprising a tread portion 2t, a pair of bead portions 2b and a pair of sidewall portions extending therebetween. The inside facing the cavity 4 is covered with an inner liner made of air-impermeable rubber.

The wheel rim 3 comprises a pair of bead seats 3s, a pair of flanges 3f each extending radially outwardly from one of the bead seats 3s and a well 3w between the bead seats for tire mounting.

The noise damper 5 is made of at least one kind of porous material having a specific gravity in a range of from 0.005 to 0.06, preferably 0.010 to 0.05, more preferably 0.016 to 0.05, still more preferably 0.016 to 0.035.

Here, the porous material means not only a foamed elastomer or plastic of an open-cell or closed-cell type but also shaped intertangled fiber such as synthetic fiber, plant fiber and animal fiber. In the under-mentioned examples, open-cell type poly-urethane foam is used.

The volume S2 of the noise damper 5 should be at least 0.004 times the volume S1 of the cavity 4. Preferably, the volume S2 is set in a range of not less than 0.01 times, more preferably not less than 0.02 times, still more preferably not less than 0.04 times, but not more than 0.2 times the volume S1.

Here, the volume S1 of the cavity 4 is defined under the normal inflated condition by the following approximate equation:

$$S1 = A \times \{(Di-Dr)/2 + Dr\} \times pi$$

wherein

"A" is the cross sectional area of the cavity 4,

"Di" is the maximum outer diameter of the cavity 4, and

"Dr" is the wheel rim diameter.

The above-mentioned normal inflated condition is such that the tire 2 is mounted on the wheel rim 3 and inflated to a standard pressure but loaded with no tire load. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 200 kPa is used as the standard pressure. The under-mentioned tread width is the maximum axial width of the ground contacting region under a standard loaded condition. The standard loaded condition is such that the tire is mounted on the wheel rim and inflated to the standard pressure and then loaded with a standard load, wherein the standard load is the "maximum load capacity"

in JATMA, the "Load capacity" in ETRTO, the maximum value given in the above-mentioned table in TRA or the like.

Figure 17:
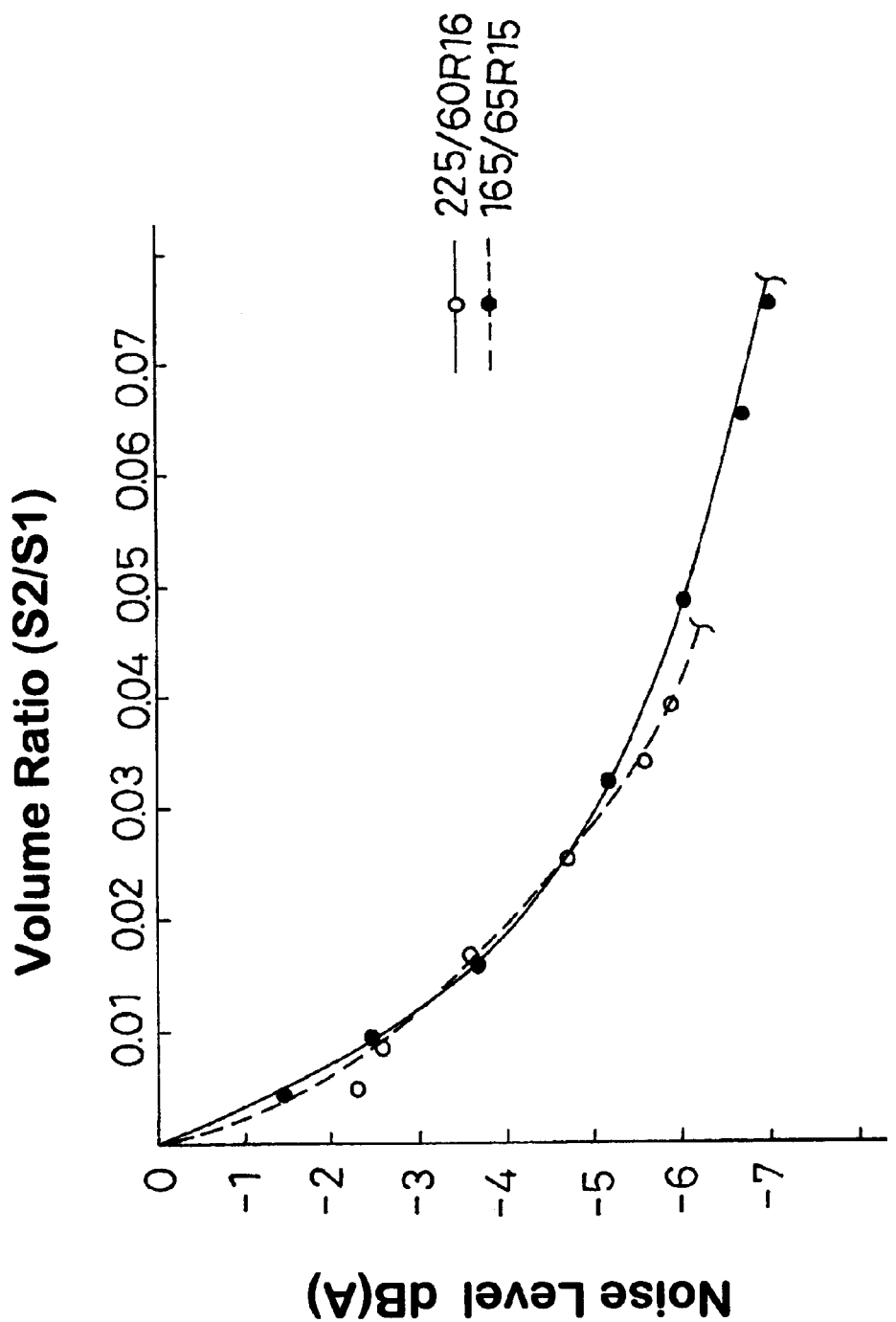
FIG. 17 is a graph showing a relationship between the volume ratio S2/S1 and noise.

FIG. 17 shows results of an inventors' test in which a resonance noise was measured changing the damper volume S2. As apparent from this figure, the resonance noise is correlative with the ratio S2/S1. By increasing the ratio S2/S1 over 0.004, the resonance noise can be effectively reduced. But, even if the ratio S2/S1 is increased over 0.2, a further reduction can not be expected or rather the tire weight is unfavorably increased so that the wheel is liable to get off rotational balance.

Figure 9:
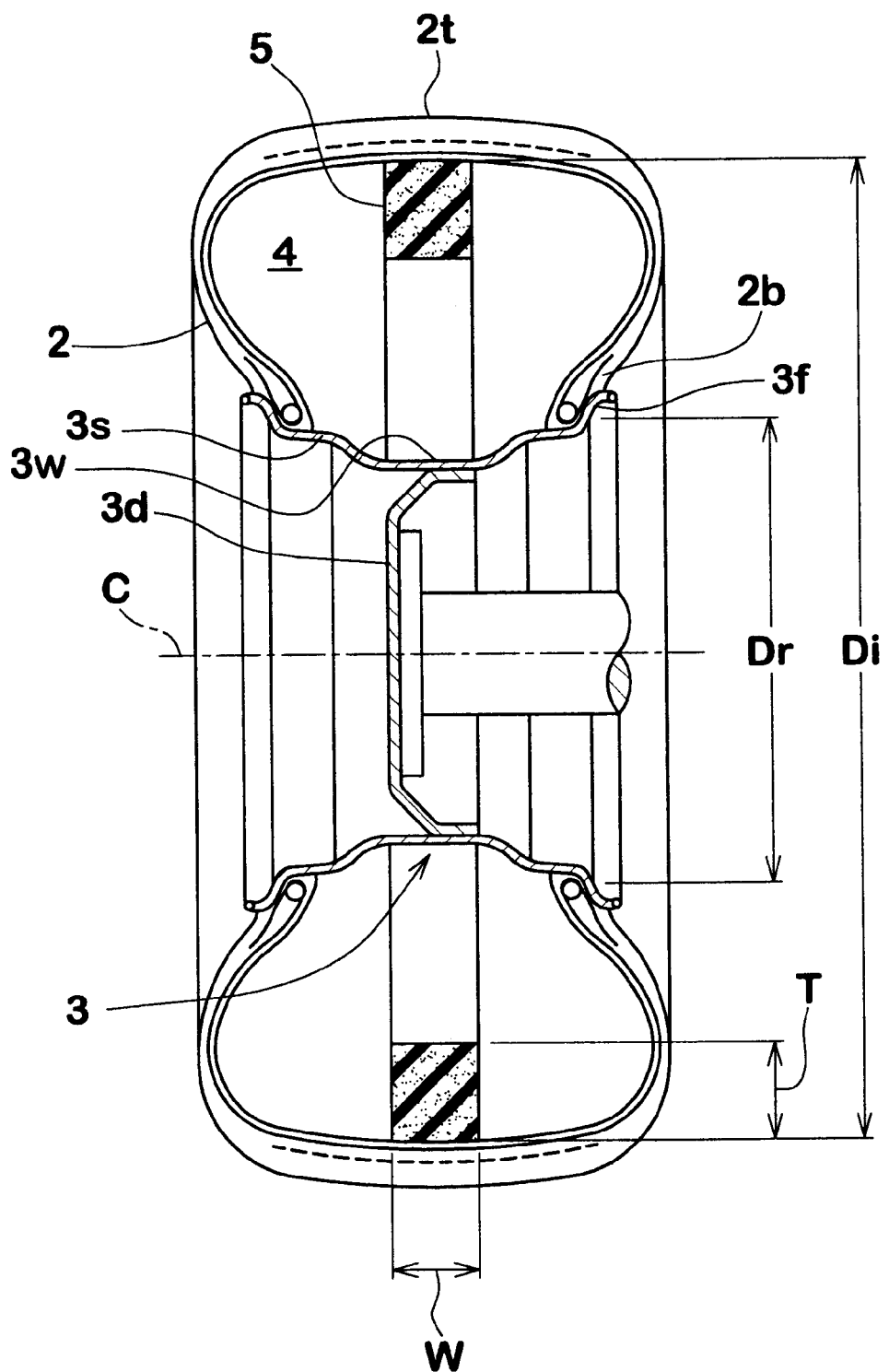
FIG. 9 is a cross sectional view of a tire and rim assembly showing another example of the cross sectional shape of the noise damper.

FIGS. 1 and 9 show embodiments in which the noise damper 5 is fixed to the pneumatic tire 2.

FIGS. 11–16 show embodiments in which the noise damper 5 is fixed to the wheel rim 3.

Pneumatic Tire with Noise Damper

FIG. 1 shows an example of the pneumatic tire 2 in which the noise damper 5 is fixed to the reverse face of the tread 2t using an adhesive agent. For the adhesive agent, a synthetic-rubber-based adhesive is preferably used.

As the synthetic-rubber-based adhesive, synthetic rubber dissolved by an organic solvent (solvent type) and synthetic rubber dispersed in water (colloidal type) can be used. Especially, chloroprene rubber dissolved by an organic solvent is preferably used because of adhesive strength, elasticity and the like. As the organic solvent, cyclohexane, acetone and hexane are preferably used alone or in combination. The content of the chloroprene rubber is set in a range of from 25 to 35 parts by weight on the basis of the entirety of the synthetic-rubber-based adhesive 9 being 100 parts by weight. If less than 25 parts by weight, it is difficult to obtain a necessary adhesive strength. If more than 35 parts by weight, it becomes difficult to apply the adhesive because of too much viscosity.

In general, the inside of a vulcanized tire is covered with a mold release agent such as silicone oil and the like. In case of synthetic-rubber-based adhesive, the adhesive strength is decreased by such a mold release agent and the noise damper 5 is liable to come off during use especially during high speed running. Accordingly, the mold release agent must be removed from the tire inside before applying the adhesive agent. However, if an organic solvent is used, the inner liner rubber is liable to be changed in quality. Therefore, buffing is preferably employed.

By applying a synthetic-rubber-based adhesive to all over or spots of a buffed face, the noise damper 5 is fixed to the tire inside 4s.

In FIG. 1, the noise damper 5 is made of one kind of open-cell type poly-urethane foam. In this case, it is preferable that the volume ratio S2/S1 is at most 0.1. The circumferential length of the noise damper 5 is at least 20 mm, and the width W is set in a range of from 20 mm to the above-mentioned tread width plus 40 mm. The thickness T is set in a range of from 3.0 mm to 80% of the section height of the cavity 4. The section height is measured under the above-mentioned normal inflated condition.

This example is a single layer of a porous material. But, it is also possible that the noise damper 5 is formed of plural layers of porous materials.

Layered Structure

Figure 2:
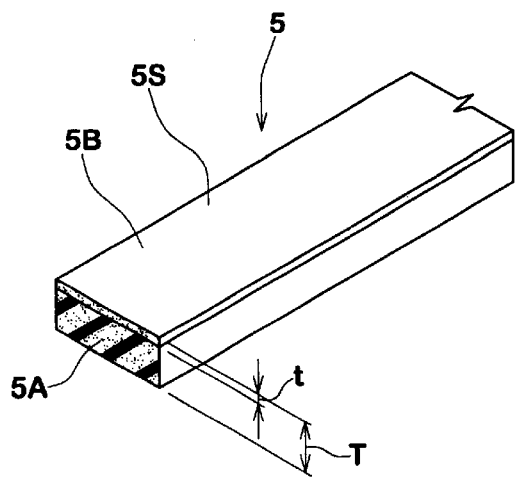
FIG. 2 is a perspective view of an example of the noise damper having a layered structure.

FIG. 2 shows the noise damper 5 having a double layered structure which comprises an outer layer 5B made of a porous material whose sound reflection coefficient is lower and an inner layer 5A made of a porous material whose sound absorption factor is higher.

In this example, two kinds of open-cell type poly-urethane foam are used for the inner layer 5A and outer layer 5B. The expansion ratio thereof is greatly increased in the outer layer 5B in comparison with the inner layer 5A so as to decrease the ratio $\alpha 2/\alpha 1$ of the specific gravity $\alpha 2$ of the outer layer 5B to the specific gravity $\alpha 1$ of the inner layer 5A in a range of not more than 0.7, preferably not more than 0.5. The thickness (t) of the outer layer 5B is preferably set in a range of from 0.05 to 0.3 times the overall thickness T of the noise damper 5.

Such a layered structure can be made using an adhesive agent. In this case, however, if the adhesive agent is applied to a wide area, such portion is liable to reflect sound wave to decrease the noise damping effect. Thus, it is preferable that the adhesive-agent-applied area Sc is not more than 0.05 times the whole area Sa.

In addition to the method bonding two layers 5A and 5B together, the layered structure can be made by another way, for example, changing the expansion ratio during foaming the materials, namely, a material including a foaming agent for a higher expansion ratio and a material including a foaming agent for a lower expansion ratio are put together and then the agents are foamed. In this case, the layers 5A and 5B are formed integrally with each other and the expansion ratio may be gradually changed in the neighborhood of their boundary. Accordingly, sound wavy reflection from the boundary portion may be effectively reduced.

As described above, an expanded elastomer is preferably used in the inner layer 5A and outer layer 5B. But, other materials such as glass wool, felt and the like may be used in the outer layer 5B.

In the example shown in FIG. 1, the cross sectional shape of the noise damper 5 is flat, namely, the width is larger than the thickness T. It is effective in reducing the noise to lessen the sound wave reflection from the noise damper 5. The above-mentioned double-layered structure can lessen the sound wave reflection by its outer layer 5B while absorbing the incident wave thereon by its inner layer 5A.

Uneven Face

It is also effective in attenuating the sound wave traveling along a surface. Thus, the surface 5S of the noise damper 5 facing the cavity 4 is preferably formed as a patterned uneven face 10.

The roughness h2 of the uneven face 10 or the distance measured between top and bottom in the height direction or depth direction is preferably set in a range of not less than 5 mm, more preferably not less than 10 mm.

Figure 3:
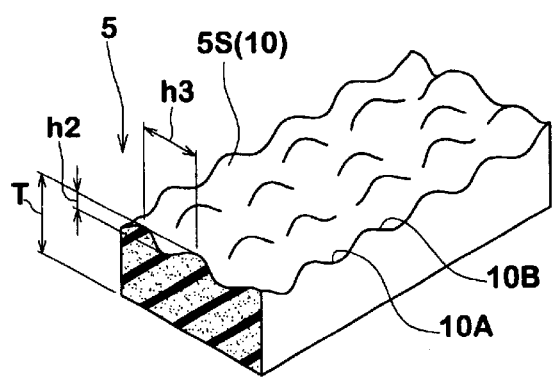
FIGS. 3–8 are perspective views showing various examples of the uneven face optionally provided on the noise damper.
Figure 4:
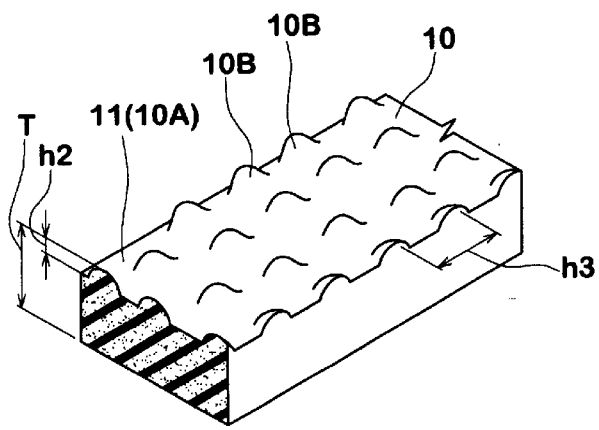
Figure 5:
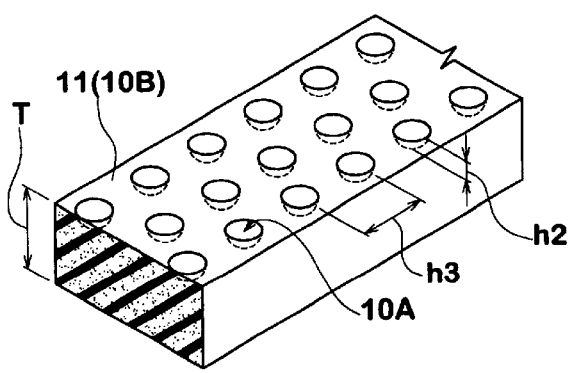

FIG. 3 shows an example of the uneven face 10 which is formed by concave 10A and convex 10B smoothly joined together, and the entirety thereof is curved or undulated and there is no flat part. FIG. 4 shows another example of the uneven face 10 which is formed by making convex protrusions 10B in a flat face part 11. FIG. 5 shows another example of the uneven face 10 which is formed by making concave holes 10A in a flat face part 11.

Figure 6:
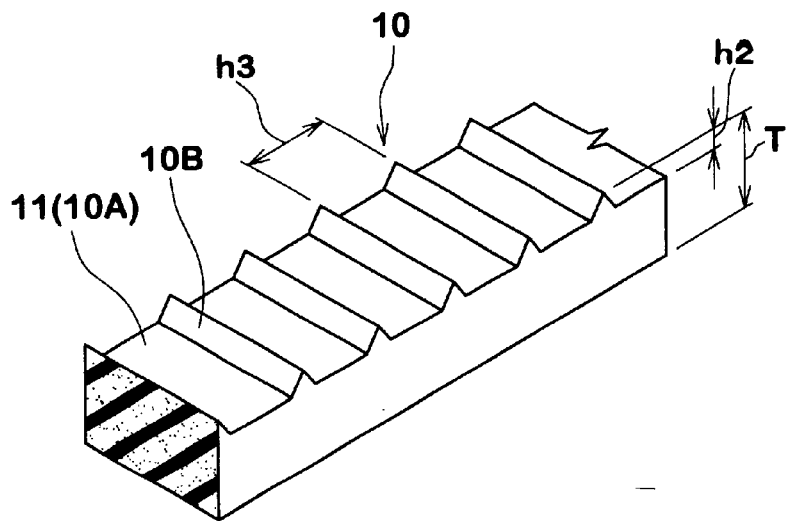
Figure 7:
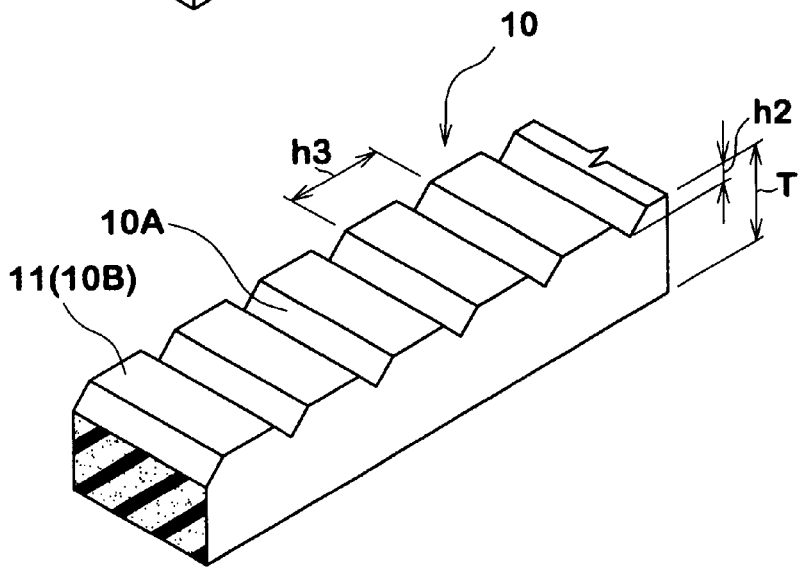
Figure 8:
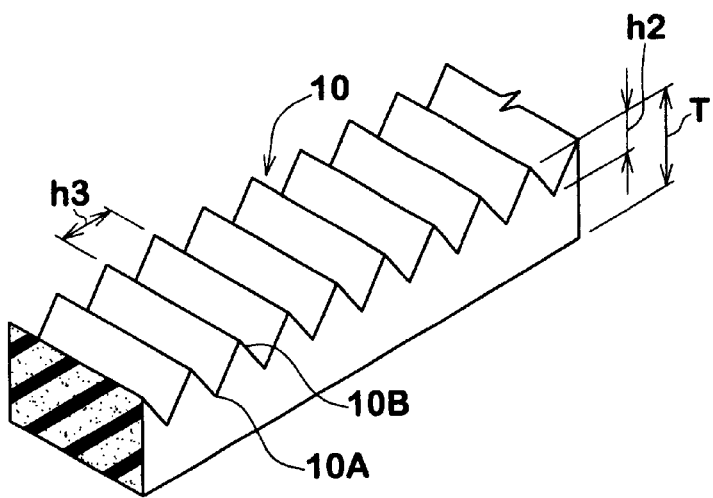

FIGS. 6–8 show other examples of the uneven face 10 formed by using grooves 10A or ridges 10B extending crosswise to the circumferential direction. In FIG. 6, the uneven face 10 is formed by parallel ridges 10B in a flat part 11. In FIG. 7, the uneven face 10 is formed by parallel grooves 10A in a flat part 11. In FIG. 8, the uneven face 10 has not a flat part 11.

As to the sizes, shapes and formation of the holes/grooves 10A and protrusions/ridges 10B, they are formed regularly in the above-mentioned examples and arranged at regular pitches h3 with respect to a direction, but it is also possible to make them irregularly.

In the uneven face 10 of the noise damper 5, the ratio Sb/Sa of the actual surface area Sb to the projected area Sa on the assumption that there is no uneven surface is preferably set in a range of from 1.04 to 5.00.

The uneven face 10 can be provided irrespective of whether the noise damper 5 is single layered or double layered.

Comparison Test 1

The following noise test was conducted using a wheel rim of size 15×6JJ and radial tires of size 195/65R15 shown in FIG. 1 and various noise dampers shown in Table 1.

1) Noise Test

A Japanese 2000cc FF car provided on all of the four wheels with tire/rim assembly was coasted on a rough asphalt road surface in a noise test course (speed=60 km/hr, tire pressure=200 kPa), and the noise sound was measured at the front seat and analyzed to obtain a peak of the sound pressure level near 245 Hz caused by the resonance of air in the caivity. The sound pressure level at the peak in dB(A) is indicated as a difference from Ref. 1.

Test results and the specifications of the dampers are shown in Table 1.

could be reduced 3.9 to 4.6 dB. By using the damper provided with the uneven face, the noise was further reduced as apparent from a comparison between Ref.2 and Ex.1 & 2 and a comparison between Ref.3 and Ex.3 to 12. Especially, as shown by Ex.3 to Ex.12, the noise reduction by the uneven face becomes displayed when the ratio Sb/Sa exceeds 1.04. Further, as known from a comparison between Ref.2 and Ex.13 to Ex.16, by using the double layered structure, a noise reduction as the same level as that by the uneven face could be obtained. Further, as apparent from Ex.13 to Ex.15, as the adhesive agent applied area became smaller, the noise was improved. By employing both the uneven face and double layered structure, the noise can be further improved.

Comparison Test 2

Further, the following high-speed durability test was conducted together with the above-mentioned noise test using a wheel rim of size 15×6JJ and radial tires of size 195/65R15 shown in FIG. 1 and noise dampers of a single layered structure of open cell type poly-ulethan foam having a specific gravity of 0.022.

TABLE 1

| Tire | Ref.1 | Ref.2 | Ex.1 | Ex.2 | Ref.3 | Ex.3 | Ex.4 | Ex.5 | Ex.6 | Ex.7 |
|---|---|---|---|---|---|---|---|---|---|---|
| Damper | none | | | | | | | | | |
| S2/S1 (%) | 0 | 5.4 | 5.4 | 5.4 | 6.8 | 6.8 | 6.8 | 6.8 | 6.8 | 6.8 |
| S2 (cu.cm) | 0 | 1647 | 1647 | 1647 | 2059 | 2059 | 2059 | 2059 | 2059 | 2059 |
| Thickness T (mm) | 0 | 10 | 10 | 10 | 12.5 | 20 | 20 | 20 | 20 | 20 |
| Width W (mm) | 0 | 90 | 90 | 90 | 90 | 90 | 90 | 90 | 90 | 90 |
| Length L (mm) | 0 | 1830 | 1830 | 1830 | 1830 | 1830 | 1830 | 1830 | 1830 | 1830 |
| Surface | — | even | uneven FIG. 5 | uneven FIG. 2 | even | uneven FIG. 8 | uneven FIG. 8 | uneven FIG. 8 | uneven FIG. 8 | uneven FIG. 8 |
| h2 (mm) | — | — | irregular | 8 | — | 15 | 15 | 15 | 15 | 15 |
| h3 (mm) | — | — | irregular | 32 | — | 4 | 6 | 10 | 40 | 80 |
| Sb/Sa | 0 | 1 | 1.02 | 1.45 | 1 | 7.57 | 5.1 | 3.16 | 1.25 | 1.07 |
| Layer | 1 | 1 | 1 | 1 | 1 | 1 | 1 | 1 | 1 | 1 |
| α2/α1 | — | — | — | — | — | — | — | — | — | — |
| t/T | — | — | — | — | — | — | — | — | — | — |
| Sc/Sa | — | — | — | — | — | — | — | — | — | — |
| Test result | | | | | | | | | | |
| Noise (dB) | 0 | −3.9 | −4.3 | −4.4 | −4.6 | −7.6 | −7.5 | −6.7 | −5.9 | −5.5 |

| Tire | Ex.8 | Ex.9 | Ex.10 | Ex.11 | Ex.12 | Ex.13 | Ex.14 | Ex.15 | Ex.16 |
|---|---|---|---|---|---|---|---|---|---|
| Damper | | | | | | | | | |
| S2/S1 (%) | 6.8 | 6.8 | 6.8 | 6.8 | 6.8 | 5.4 | 5.4 | 5.4 | 5.4 |
| S2 (cu.cm) | 2059 | 2059 | 2059 | 2059 | 2059 | 1647 | 1647 | 1647 | 1647 |
| Thickness T (mm) | 20 | 20 | 20 | 20 | 20 | 10 | 10 | 10 | 10 |
| Width W (mm) | 90 | 90 | 90 | 90 | 90 | 90 | 90 | 90 | 90 |
| Length L (mm) | 1830 | 1830 | 1830 | 1830 | 1830 | 1830 | 1830 | 1830 | 1830 |
| Surface | uneven FIG. 8 | uneven FIG. 8 | uneven FIG. 8 | uneven FIG. 8 | uneven FIG. 8 | even | even | even | uneven FIG. 5 |
| h2 (mm) | 15 | 15 | 15 | 15 | 15 | — | — | — | irregular |
| h3 (mm) | 100 | 120 | 140 | 160 | 200 | — | — | — | irregular |
| Sb/Sa | 1.04 | 1.031 | 1.023 | 1.017 | 1.011 | 1 | 1 | 1 | 1.02 |
| Layer | 1 | 1 | 1 | 1 | 1 | 2 | 2 | 2 | 2 |
| α2/α1 | — | — | — | — | — | 0.5 | 0.5 | 0.5 | 0.5 |
| t/T | — | — | — | — | — | 0.2 | 0.2 | 0.2 | 0.2 |
| Sc/Sa | — | — | — | — | — | 100% | 5% | 0% | 0% |
| Test result | | | | | | | | | |
| Noise (dB) | −5.2 | −5 | −4.8 | −4.7 | −4.6 | −4 | −4.6 | −5 | −5.5 |

In Ex.1 to Ex.12 and Ref.2 and 3, the dampers had a single-layered structure of open-cell type poly-urethane foam having a specific gravity of 0.022. Ex.13 to Ex.16 had a double-layered structure of the inner layer made of open-cell type poly-urethane foam having a specific gravity of 0.022 and the outer layer made of open-cell type poly-urethane foam having a specific gravity of 0.010.

As known from a comparison between Ref.1 and Ref.2 & 3, even when the damper had an even surface, the noise 2) High-speed Durability Test Using a tire test drum, a cyclic test, which repeats running for 20 minutes at a speed, checking the noise damper for damage, increasing the speed by a step of 10 km/hr from 120 km/hr to 250 km/hr, was made under a tire pressure of 280 kPa and tire load of 4.83 kN, until the noise damper was broken or the speed reached to 250 km/hr without broken.

Test results and the specifications of the dampers are shown in Table 2.

TABLE 2

| Tire | Ref.1 | Ref.2 | Ex.1 | Ex.2 | Ex.3 | Ex.4 | Ex.5 |
|---|---|---|---|---|---|---|---|
| Damper | none | | | | | | |
| S2/S1 (%) | 0 | 5.4 | 5.4 | 5.4 | 5.4 | 5.4 | 5.4 |
| Volume S2 (cu.cm) | 0 | 1647 | 1647 | 1647 | 1647 | 1647 | 1647 |
| Thickness T (mm) | — | 10 | 10 | 10 | 10 | 10 | 10 |
| Width W (mm) | — | 90 | 90 | 90 | 90 | 90 | 90 |
| Length L (mm) | — | 1830 | 1830 | 1830 | 1830 | 1830 | 1830 |
| Surface | — | even | even | even | even | uneven FIG. 5 | uneven FIG. 8 |
| h2 (mm) | — | — | — | — | — | irregular | 8 |
| h3 (mm) | — | — | — | — | — | irregular | 32 |
| Sb/Sa | — | 1 | 1 | 1 | 1 | 1.02 | 1.45 |
| fixee ?*1 | — | no | yes | yes | yes | yes | yes |
| Application | — | — | spot | spot | all over | all over | all over |
| Buffed ? | — | — | no | yes | yes | yes | yes |
| Test Results | | | | | | | |
| Noise (dB) | 0 | −4.9 | −4.2 | −4.2 | −3.9 | −4.3 | −4.4 |
| High-speed durability (km/hr) | — | 160 | 160 | 250 | 250 | 250 | 250 |
| Damper broken ? | — | yes | yes | no | no | no | no |

*1) In order to fix the damper to the tire inside, a synthetic-rubber-based adhesive (chloroprene rubber = 30%, cyclohexane + acetone + hexane = 70%) was used.

In Ref.2 after the damper was broken at 160 km/hr, the noise was increased from −4.9 dB to −0.7 dB. In Ex.2 and Ex.3, the noise reducing effect was slightly low in comparison with Ref.2, but it could be maintained up to 250 km/hr. In Ex.1, as the tire inside was not buffed, the damper was separated at 120 km/hr and broken at 160 km/hr. In Ex.4 and Ex.5, as the damper surface was made uneven, the noise was further improved.

Radially Oblong Cross Sectional Shape

FIG. 9 shows another example of the noise damper 5 which has a radially oblong cross sectional shape in which the thickness T is larger than the width W.

When the pneumatic tire 2 is a low-aspect tire or a wide tread tire which are widely used nowadays, it is effective in controlling the air resonance of the cavity 4 to divide the width of the cavity 4 in two.

Figure 18:
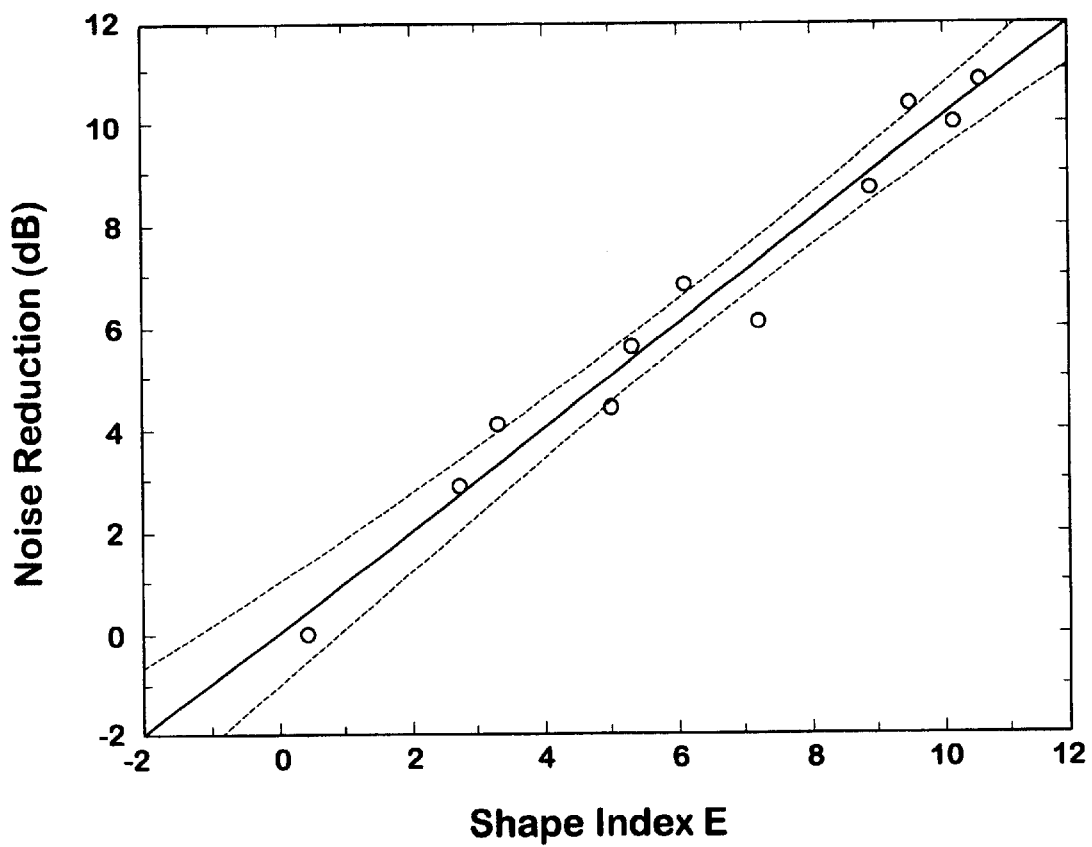
FIG. 18 is a graph showing a relationship between the shape index E and noise.

FIG. 18 shows results of a multi-regression analysis of the air resonance noise level and the size (width W, thickness T and length L) of the noise damper 5. From the results, it was discovered that if a shape index E is defined by the following equation $$E = 0.42 + 0.45 \times (W \times T \times L/S1 \times 100) + 1.11 \times (T/W)$$

then noise reduction in dB becomes in direct proportion to the shape index E with the proportionality constant being 1. For example, if the shape index E is 1, the noise reduction becomes about 1 dB. Thus, the resonance noise reduces as the shape index E increases. As the noise reduction can be realized when it exceeds about 2 dB, the shape index E should be set in a range of not less than 2, preferably not less than 5.

The value "W×T×L" in the second term corresponds to the volume S2 of the noise damper 5. Therefor, the contribution of the volume S2 to the noise reduction is 0.45 (45%) whereas the value "T/W" in the third term is 1.11 (111%). Accordingly, it is more effective in increasing the shape index E or reducing the noise to adjust the thickness/width ratio T/W rather than the volume S2. By properly selecting a value for the thickness/width T/W, the same noise reduction may be obtained while decreasing the volume S2.

From this point of view, the T/W ratio is preferably set in a range of not less than 0.5, more preferably not less than 1.0 but preferably not more than 3.0.

As shown in FIGS. 9 and 10a–10e, the noise damper 5 oblong in the tire radial direction may have various cross sectional shapes such as a rectangle (FIG. 9), triangle or V-shape (FIG. 10a), U-shape (FIG. 10b), trapezoidal (FIGS. 10c, 10d), conventional-keyhole shape (FIG. 10e) and the like.

In the examples shown in FIGS. 9 and 10a–10e, open-cell type poly-urethane foam having a specific gravity of from 0.005 to 0.06, preferably 0.010 to 0.05, more preferably 0.016 to 0.05, still more preferably 0.016 to 0.035 is used. In the radially oblong noise damper 5 too, it is possible to provide the surface 5S facing the cavity 4 with the above-mentioned uneven face 10. Further, it is possible to provide the noise damper 5 with the above-mentioned double layered structure. In this case, it is preferable that the outer layer 5B is formed along the entire surface as shown in FIGS. 10a–10e by a broken line.

It is possible to make a flame proof finish on the noise damper 5 by applying a flame retardant.

Comparison Test 3

Using a wheel rim of size 16×6.5JJ and radial tires of size 215/60R16 shown in FIG. 9, and radially oblong noise dampers having a single layered structure of open-cell type poly-urethane foam having a specific gravity of 0.02, the following noise test was conducted.

3) Noise Test

A Japanese 2300cc FF car provided on all of the four wheels with tire/rim assembly was coasted on a rough asphalt road surface in a noise test course (speed=60 km/hr, tire pressure=200 kpa), and the noise sound was measured at the front seat and analyzed to obtain a peak of the sound pressure level near 230 Hz caused by resonance. In Table 1, the sound pressure level at the peak in dB(A) is indicated as a difference from Ref.

Test results and the specifications of the dampers are shown in Table 3.

TABLE 3

| Tire | Ref. | Ex.1 | Ex.2 | Ex.3 | Ex.4 | Ex.5 | Ex.6 | Ex.7 | Ex.8 |
|---|---|---|---|---|---|---|---|---|---|
| Damper | none | | | | | | | | |
| Shape | — | FIG. 9 | FIG. 9 | FIG. 9 | FIG. 9 | FIG. 9 | FIG. 9 | FIG. 9 | FIG. 9 |
| Width W (mm) | — | 10 | 10 | 10 | 10 | 4 | 2 | 4 | 2 |
| Thickness T (mm) | — | 1 | 2 | 3 | 4 | 2.5 | 5 | 5 | 10 |
| Length L (mm) | — | 183 | 183 | 183 | 183 | 183 | 183 | 183 | 183 |
| T/W | — | 0.1 | 0.2 | 0.3 | 0.4 | 0.625 | 2.5 | 1.25 | 5 |
| S2/S1*1 (%) | — | 4.9 | 9.8 | 14.7 | 19.6 | 4.9 | 4.9 | 9.8 | 9.8 |
| Shape index E | — | 2.7 | 5.1 | 7.4 | 9.7 | 3.3 | 5.4 | 6.2 | 10.4 |
| Test Result | | | | | | | | | |
| Noise (dB) | 0 | −2.9 | −4.4 | −6.1 | −10.5 | −4.1 | −5.6 | −6.8 | −10 |

Figure 10A:
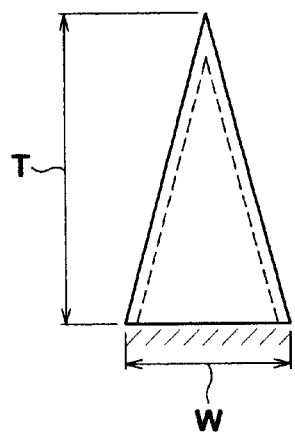
FIGS. 10a, 10b, 10c, 10d and 10e each show another example of the cross sectional shape of the noise damper.
Figure 10B:
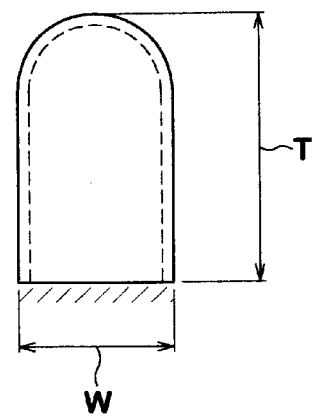
Figure 10C:
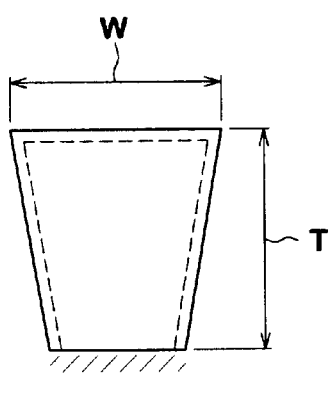
Figure 10D:
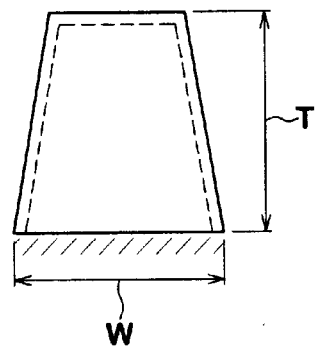
Figure 10E:
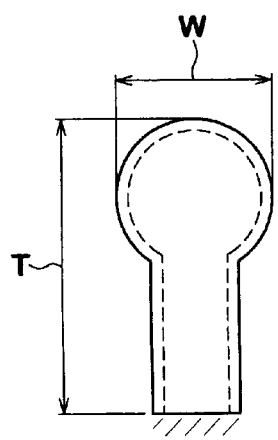

| Tire | Ex.9 | Ex.10 | Ex.11 | Ex.12 | Ex.13 | Ex.14 | Ex.15 |
|---|---|---|---|---|---|---|---|
| Damper | | | | | | | |
| Shape | FIG. 9 | FIG. 9 | FIG. 10a | FIG. 10c | FIG. 10e | FIG. 10b | FIG. 10d |
| Width W (mm) | 4 | 3 | 4 | 5 | 3.6 | 4 | 5 |
| Thickness T (mm) | 7.5 | 10 | 7 | 5 | 6.8 | 6 | 5 |
| Length L (mm) | 183 | 183 | 183 | 183 | 183 | 183 | 183 |
| T/W | 1.875 | 3.3 | 1.75 | 1 | 1.89 | 1.5 | 1 |
| S2/S1*1 (%) | 14.7 | 14.7 | 6.9 | 9.8 | 8.2 | 10.9 | 9.8 |
| Shape index E | 9.1 | 10.7 | 5.5 | 5.9 | 6.2 | 7 | 5.9 |
| Test Result | | | | | | | |
| Noise (dB) | −8.7 | −10.8 | −6.8 | −7.3 | −6.9 | −7 | −6.8 |

*1) Cavity volume S1 = 3.73 × 10$^4$ cu.cm

Wheel Rim with Noise Damper

FIGS. 11–16 show embodiments in which the noise damper 5 is fixed to the wheel rim 3.

The wheel rim 3 used in the above-mentioned embodiments are a conventional or ordinary wheel rim. The noise damper 5 in the present invention can be used in combination with such a conventional rim. But, when the noise damper 5 is fixed to the wheel rim 3, it is preferable that the wheel rim 3 is provided with a shelter groove 9 to prevent the noise damper 5 from being damaged by the tire beads 2b during mounting the tire on the rim. Incidentally, the wheel rim 3 can be formed integrally with a disk portion 3d for attachment to a vehicle axis. But, it is also possible to make the wheel rim 3 and disk portion 3d separately and then fixed to each other.

The shelter groove 9 is formed within the rim well 3w. Preferably, the groove depth T2 is set in a range of not more than 20 mm, and the groove width W2 is set in a range of not more than 60 mm. The shelter groove 9 is provided with a cross sectional shape adapted to that of the noise damper 5. The entirety or major part of the noise damper 5 is put in the shelter groove 9.

Usually, the shelter groove 9 extends continuously in the circumferential direction, but it can be discontinuous at one or more circumferential positions.

Figure 12:
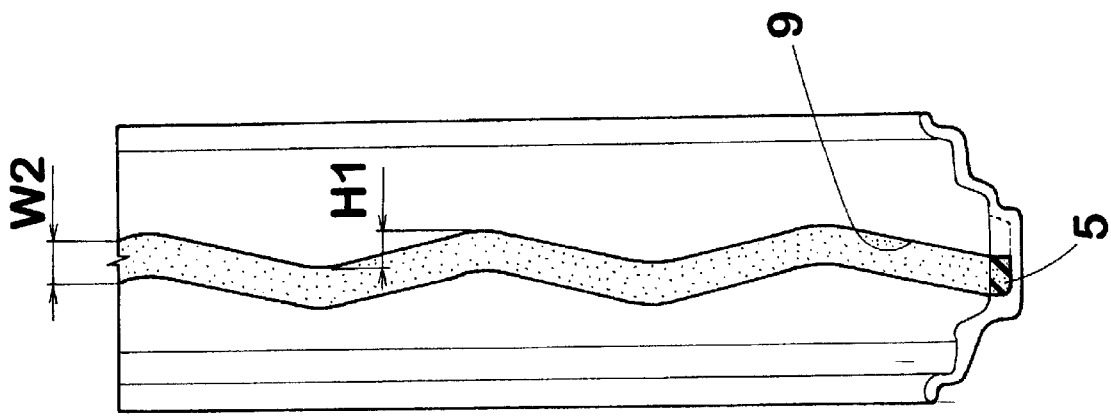
FIG. 12 is a developed view showing the wheel rim thereof.

In the example shown in FIG. 12, the shelter groove 9 extends straight. But, the example shown in FIG. 13 extends zigzag in the circumferential direction. In case of zigzag groove, the peak-to-peak amplitude H1 of each groove edge is preferably set in a range of from 0.3 to 1.0 times the groove width W2 in the axial direction. Preferably, the number N of the zigzag cycles around the rim well 3w is set in a range of from 4 to 20. Therefore, the protruding parts of the zigzag groove edges towards the groove can prevent the tire beads from falling into the shelter groove 9 during mounting the tire on the rim.

FIG. 14 shows another example of the shelter groove 9. This example is straight, but piers 20 protruding into the groove from at least one of the groove walls are provided in order to prevent tire beads falling into the groove 9. In this case, the noise damper 5 may be provided with cuts 21 to clear the piers 20. In the example shown in FIG. 14, the piers 20 are staggeringly disposed on both the groove walls, and the protrusion H2 of each pier 20 in the axial direction is set in a range of not less than 0.3 times, preferably not less than 0.5 times the groove width W2. The piers 20 can be extend to the groove bottom. The upper faces of the piers 20 are at the same level as the bottom of the rim well 3w, and the axial ends of the piers 20 are rounded by a radius of about 2.0 mm to prevent the tire beads from getting scratched.

In the above-mentioned examples, the noise damper 5 is preferably fixed to the bottom of the shelter groove 9 by using the adhesive agent.

In case the noise damper 5 protrudes from the bottom of the rim well 3w, it is preferable that the protrusion H is limited in a range of not more than 15 mm from the bottom level of the rim well 3w. The protruding part of the noise damper 5 can be formed as the above-mentioned uneven face 10 and/or outer layer 5B.

Protector

FIGS. 15 and 16 show protectors 22 for the noise damper 5. In contrast to the above-mentioned piers 20 which are formed integrally with the rim main, the protectors 22 are separate, but it has the same purpose, namely, to protect the noise damper 5 from tire beads during tire mounting.

The protector 22 is a mesh-like structure which comprises circumferentially extending side frames 22s fixed to both sides of the shelter groove 9, and crossbars 22c extending between the side frames 22s.

In FIG. 15, the crossbars 22c are formed integrally with the side frames 22s using a rigid material such as metallic material and plastics material.

In FIG. 16, the crossbars 22c are formed in a form of cross mesh separately from the side frames 22s using a material different from the side frames.

Thus, the noise damper 5 is prevented from being took out from the shelter groove 9 and being torn off by tire beads 2b at the time of tire mounting. Also the tire beads 2b are prevented from falling into the shelter groove 9.

The noise damper 5 is pushed into the shelter groove 9 and then the protector 22 is fixed. As a result, due to the sponge-like elasticity of the noise damper 5, part of the noise damper 5 adjacent to the surface 5S protrudes through the meshes and thereby uneven face 10 having the same pattern as the meshes is formed. The size of the meshes is determined accordingly.

Comparison Test 4

Figure 11:
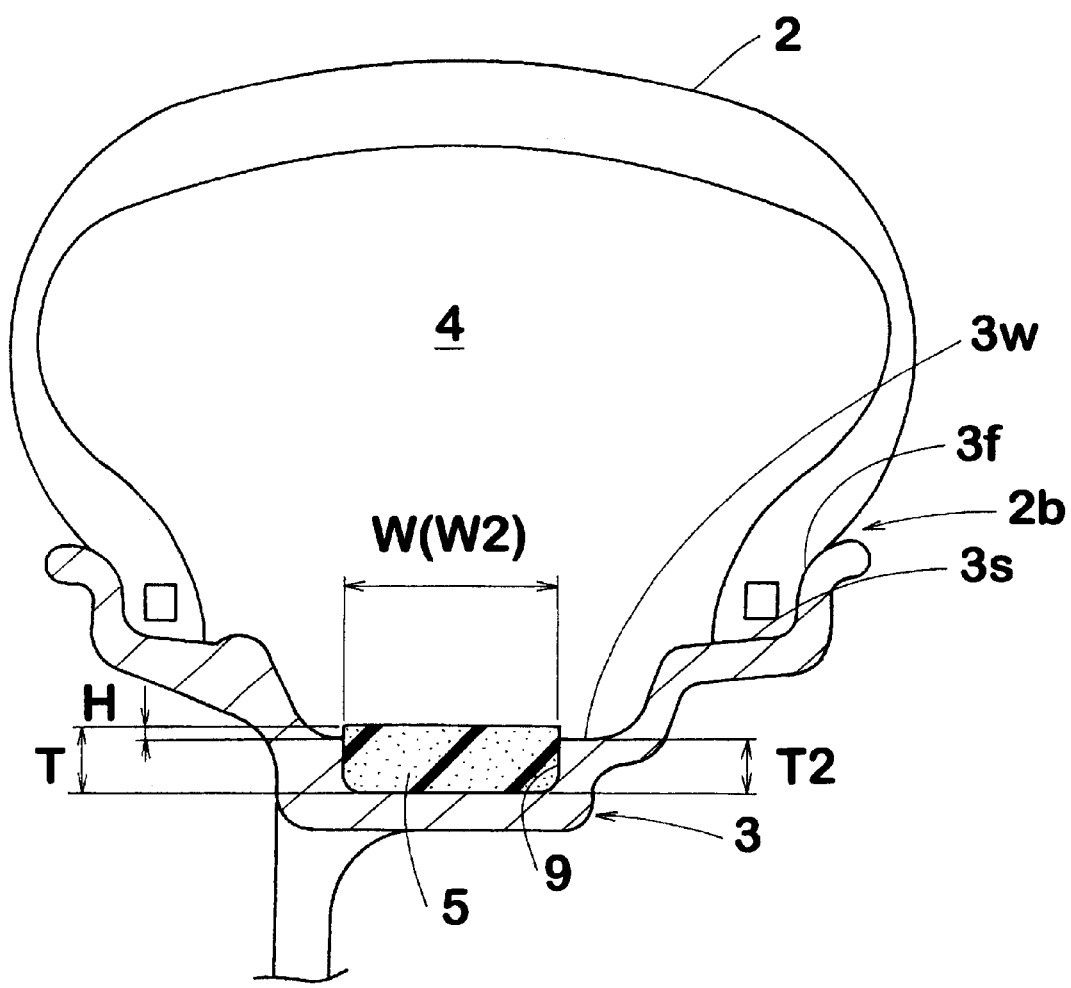
FIG. 11 is a cross sectional view of a tire and rim assembly showing another embodiment of the present invention.

The following tire mounting test and noise test were conducted using a radial tire of size 165/65R15, wheel rims of size 15×5J having the same structure shown in FIG. 11 except for the shelter groove 9 and protector 22, and noise dampers 5 made of open-cell type poly-urethane foam having a specific gravity of 0.022.

Test results and the specifications of the wheel rims and dampers are shown in Table 4.

4) Mounting Test

The workability when mounting the tire on the wheel rim was evaluated into five ranks based on Ref.1 being 5, wherein the larger the rank number, the better the workability.

5) Noise Test

A Japanese 1500 cc hybrid car provided on all of the four wheels with tire/rim assembly was coasted on a rough asphalt road surface in a noise test course (speed=60 km/hr, tire pressure=200 kPa), and the noise sound was measured at the front seat and analyzed to obtain a peak of the sound pressure level near 248 Hz caused by resonance. In Table 4, the sound pressure level at the peak in dB(A) is indicated as a difference from Ref.1.

4. A tire noise reducing system according to claim 2, wherein
   the outer layer is provided with an uneven surface facing the cavity.

5. A tire noise reducing system according to claim 1, wherein
   the noise damper has a width W in the tire axial direction; a thickness T in the tire radial direction; and a length L in the tire circumferential direction which satisfy the following condition:

$0.42+0.45\times(W\times T\times L/S1\times 100)+1.11\times(T/W)>1.$

6. A tire noise reducing system according to claim 5, wherein
   wherein the width W, the thickness T and the length L satisfy the following condition:

$0.42+0.45\times(W\times T\times L/S1\times 100)+1.11\times(T/W)>2.$

7. A tire noise reducing system according to claim 5 or 6, wherein
   the ratio T/W of the thickness T to the width W is not less than 1.

8. A tire noise reducing system according to claim 1, wherein
   the noise damper is secured to the inner surface of the tread of the pneumatic tire.

TABLE 4

Figure 13:
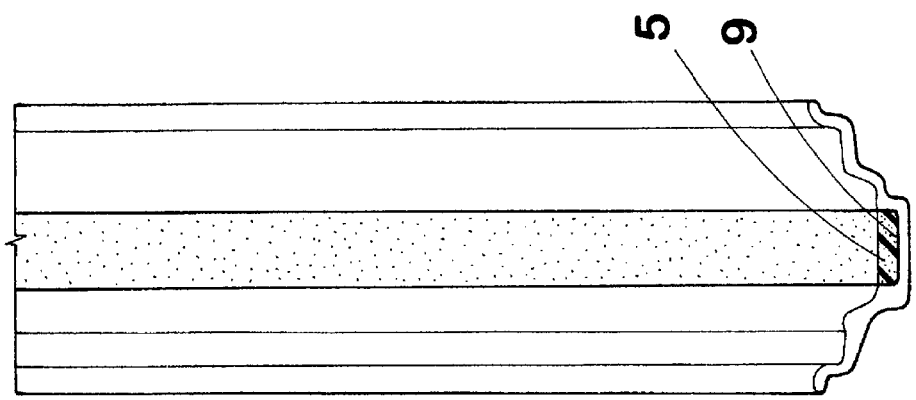

| Wheel Rim | Ref.1 | Ref.2 | Ex.1 | Ex.2 | Ex.3 | Ex.4 | Ex.5 | Ex.6 | Ex.7 |
|---|---|---|---|---|---|---|---|---|---|
| Shelter groove | none | none | FIG. 12 | FIG. 12 | FIG. 12 | FIG. 13 | FIG. 14 | FIG. 15 | FIG. 16 |
| Piers | — | — | — | — | — | — | FIG. 14 | — | — |
| Protector | — | — | — | — | — | — | — | FIG. 15 | FIG. 16 |
| Damper | none | | | | | | | | |
| Volume S2 (cu.cm) | 0 | 446 | 208 | 104 | 416 | 208 | 208 | 416 | 416 |
| Thickness T (mm) | 0 | 10 | 10 | 5 | 10 | 10 | 10 | 10 | 10 |
| Width W (mm) | 0 | 40 | 20 | 20 | 40 | 20 | 20 | 40 | 40 |
| Length L (mm) | 0 | 1115 | 1040 | 1040 | 1040 | 1040 | 1040 | 1040 | 1040 |
| S2/S1*1 (%) | 0 | 2.24 | 1.04 | 0.52 | 2.09 | 1.04 | 1.04 | 2.09 | 2.09 |
| Test results | | | | | | | | | |
| Mounting | 5 | 1 | 3 | 3 | 3 | 4 | 4 | 5 | 5 |
| Noise (dB) | 0 | −4.4 | −2.7 | −1.2 | −4 | −2.8 | −2.6 | −3.7 | −3.8 |

*1) Cavity: Volume S1 = 1.99 × 10$^4$ cu.cm, Cross sectional area A = 134.64 sq.cm

What is claimed is:

1. A tire noise reducing system comprising:
   a pneumatic tire,
   a wheel rim on which the pneumatic tire is mounted, and
   a noise damper disposed in a cavity surrounded by an inner surface of the rim and an inner surface of the tire mounted thereon,
   the noise damper being made of a porous material having a specific gravity of from 0.005 to 0.06 and secured on the inner surface of the tire, facing the interior of the cavity,
   the volume S2 of the noise damper being in a range of from 0.4 to 20.0% of the volume S1 of the cavity.

2. A tire noise reducing system according to claim 1, wherein
   the noise damper is provided with a layered structure comprising an outer layer for less sound reflection facing the cavity and an inner layer for sound absorption.

3. A tire noise reducing system according to claim 1, wherein
   the noise damper is provided with an uneven surface facing the cavity.

9. A tire noise reducing system according to claim 8, wherein
   the noise damper is fixed to a buffed inner surface of the tread by a synthetic-rubber-based adhesive.

10. A tire noise reducing system according to claim 9, wherein
    the synthetic-rubber-based adhesive includes chloroprene rubber dissolved by an organic solvent.

11. A pneumatic tire comprising:
    a tread portion,
    a pair of bead portions,
    a pair of sidewall portions extending therebetween, and
    a noise damper fixed to the inner surface of the tread and made of a porous material having a specific gravity of from 0.005 to 0.06,
    the noise damper provided with a layered structure comprising an outer layer for less sound reflection facing the tire cavity and an inner layer for sound absorption.

12. A pneumatic tire comprising:
    a tread portion,
    a pair of bead portions, a pair of sidewall portions extending therebetween, and a noise damper fixed to the inner surface of the tread and made of a porous material having a specific gravity of from 0.005 to 0.06, the noise damper provided with an uneven surface facing the tire cavity.

13. A pneumatic tire according to claim 11 or 12, wherein the noise damper has a width W in the tire axial direction; a thickness T in the tire radial direction; and a length L in the tire circumferential direction which satisfy the following condition:

$$0.42 + 0.45 \times (W \times T \times L / S1 \times 100) + 1.11 \times (T/W) > 1.$$

14. A pneumatic tire according to claim 11 or 12, wherein the noise damper has a width W in the tire axial direction; a thickness T in the tire radial direction; and a length L in the tire circumferential direction which satisfy the following condition:

$$0.42 + 0.45 \times (W \times T \times L / S1 \times 100) + 1.11 \times (T/W) > 1$$

and

S1 is the above-mentioned volume of the cavity, and the ratio T/W of the thickness T to the width W is not less than 1.

* * * * *